Patented May 11, 1937

2,079,953

UNITED STATES PATENT OFFICE 2,079,953

CUPRIC MIXTURES FOR AGRICULTURAL PURPOSES AND METHOD FOR PREPARING SAME

Pierre Francois Joseph Souviron, Tarbes, France

No Drawing. Application June 10, 1935, Serial No. 25,962. In France June 18, 1934

3 Claims. (Cl. 167—16)

Mixtures used for agricultural purposes under the name of cupric mixtures, are constituted by a non-soluble or slightly soluble cupric hydrate or salt held in suspension in water and obtained generally by precipitation.

The principal physical qualities sought in such mixtures are the fineness of the precipitate and the homogeneity and stability of its suspension in water.

The cupric mixtures in use possess these qualities only to a limited degree. The cupric precipitate thereof may be separated from the suspension by paper or even canvas filters of the roughest kind. Its suspension in water remains only for a few hours when it is properly prepared by the wine dresser and can be restored again only by stirring.

My invention has for its object to furnish a cupric mixture in which the cupric particles have a fineness such that they pass through paper filters of medium grade and form with water a stable suspension which remains for several weeks. Even after complete drying on a water bath, my improved mixture is capable of forming a suspension again, when water is added.

This mixture is characterized by the fact that it contains a cupric oxychloride having the general formula $nCu(OH)_2, CuCl_2, mH_2O$, giving a neutral or slightly acid reaction with reference to litmus and containing a certain amount of a soluble salt of barium.

I have noticed that I obtain the best results when preparing such a mixture by decomposing by means of a suitable acid or metal salt a compound of a cupric hydrate with an alkaline-earth or magnesium chloride the formula of which is $4 Cu(OH)_2, RCl_2, mH_2O$, in which R designates an alkaline earth metal or magnesium. The preparation of these compounds has been described in my prior French specification 766,291.

This decomposition may be performed for instance by means of cupric sulphate or chloride or else by an acid such as sulphuric or hydrochloric acid. I add a soluble salt of barium, except in the case where an excess of such a soluble salt is already formed during the reaction.

If a metallic sulphate such as copper sulphate is used, it seems that the reaction, when the compound used is $4 Cu(OH)_2CaCl_2$, is expressed by the following formula:

(1) $4Cu(OH)_2CaCl_2 + CuSO_4 + BaCl_2 =$
    $4Cu(OH)_2CuCl_2 + BaSO_4 + CaCl_2$ It is essential to use as exactly as possible relative proportions of the different reagents which correspond to the above formula, i. e. equimolecular proportions. An excess of 10 to 20% of any of the reagents is sufficient to prevent the precipitate from being a stable suspension. It is however preferable for the barium chloride to be in slight excess of the copper sulphate; if not, after the reaction is at an end, I add a small amount of barium chloride.

The barium chloride may be replaced by another soluble salt of barium such as barium nitrate or acetate. These latter salts are also preferably used in slight excess with reference to equimolecular proportions.

If the compound treated is $4Cu(OH)_2BaCl_2$ the reaction is probably (2) $4Cu(OH)_2BaCl_2 + CuSO_4 =$
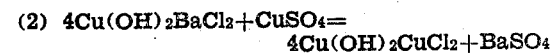
    $4Cu(OH)_2CuCl_2 + BaSO_4$ I add either during reaction or afterwards, a small amount of barium chloride.

It is also possible to replace the copper sulphate by certain metallic sulphates which have, in common with copper sulphate, the property of decomposing the cupric hydrate-alkaline earth chloride compound: such as sulphate of aluminium, sulphate of zinc and sulphate of nickel.

Instead of a metallic sulphate, it is possible to use a chloride, for instance cupric chloride; in the case of $4Cu(OH)_2CaCl_2$ the reaction is (3) $4Cu(OH)_2CaCl_2 + CuCl_2 =$
    $4Cu(OH)_2CuCl_2 + CaCl_2$ a little barium chloride being added.

In the case of $4Cu(OH)_2BaCl_2$ the reaction is (4) $4Cu(OH)_2BaCl_2 + CuCl_2 =$
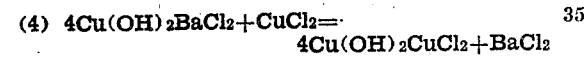
    $4Cu(OH)_2CuCl_2 + BaCl_2$ It is useless to add a soluble salt of barium as it already exists in the solution in this latter case.

In the different reactions mentioned, it is obvious that the additions of copper chloride and sulphate may be replaced by hydrochloric or sulphuric acid, care being taken to correspondingly increase the amount of oxychloride reacting. The reactions are probably in accordance with the following formulae:

(5) $5[4Cu(OH)_2BaCl_2] + 4H_2SO_4 =$
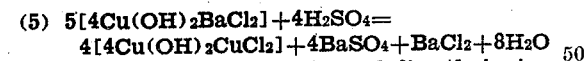
    $4[4Cu(OH)_2CuCl_2] + 4BaSO_4 + BaCl_2 + 8H_2O$ The reaction may be performed directly by incorporating to the compound hydrate and chloride, the amount of sulphuric acid required and crushing the mass thus obtained.

Hydrochloric and sulphuric acids may be replaced by nitric or acetic acids which will give similar results.

In the preceding reactions it has been admitted for the sake of greater simplicity that the compound 4Cu(OH)₂CuCl₂ is always obtained. It is possible however that the final compound does not correspond exactly to this formula and that it is constituted by a mixture of different oxychlorides such as

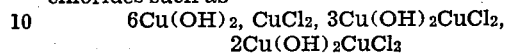

among those the existence of which is certain.

The colloidal cupric oxychloride obtained should not be considered as characterized by its formula, but by its property of forming with water a stable colloidal suspension showing brownian movements, whereby it distinguishes from all cupric oxychlorides obtained by any hitherto known means.

The mixture according to invention may also be obtained directly from metallic copper, preferably cement copper or fine filings.

It is sufficient to admix such copper in the dry way with copper sulphate and barium chloride. The mass remains then exposed to air during several days. There are produced an oxidation and a series of transformations which lead finally to the reaction.

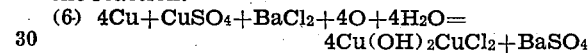

In practice it is necessary for the copper sulphate to be in excess with reference to the copper and the barium chloride to be in excess with reference to the copper sulphate. The presence of a small amount of an ammoniacal salt accelerates the reaction.

The copper sulphate may be replaced by cupric chloride which thus avoids the formation of sulphate of barium.

The different abovementioned reactions lead to mixtures, the richness of which in copper is higher than that of the mixtures generally on the market. It is possible to lower their contents of copper down to the desired value, not only by adding non-soluble filling material such as sulphur or talc, but also by adding certain soluble salts which do not destroy the emulsion of alkaline and earth alkaline nitrates and chlorides.

In the mixtures prepared according to this invention, it seems as if the soluble salt of barium were acting chiefly so as to eliminate the soluble sulphates formed in the reaction or existing more or less in the industrial waters used for preparing the mixtures. Thus it has been noticed that salts of calcium and strontium metals of which the sulphates are less insoluble than barium sulphate, yield far less good results.

The reaction of the mixture should remain slightly acid so as to make up for the alkaline nature of the industrial waters generally used for its dilution prior to use. This acidity is provided by the presence of a small amount of a free cupric salt which generally is cupric chloride. If however it is desired to avoid the presence of such cupric salts, it is sufficient to add to the product an alkaline or an alkaline-earth acetate which, through double decomposition with cupric chloride, produces cupric acetate the anticryptogamic action of which, chiefly against mildew, has been always acknowledged.

*Example I*

A mixture is made of—
60 kgs. of a cupric hydrate—calicum chloride compound containing 42% of copper the formula being 4Cu(OH)₂CaCl₂mH₂O, prepared for instance in accordance with the disclosure in my abovementioned prior specification.

25 kgs. of crystallized copper sulphate.
28 kgs. of crystallized barium chloride.

The whole is then crushed in a mill or a centrifugal crusher.

The product when crushed is left in a heap during one or two days. Its color, originally blue, becomes green and the mass becomes damp by reason of the freeing of the crystallization water of the copper sulphate and barium chloride.

The mixture is then ready to be used. It may be sold either in moist or dried state. The drying may be performed at the temperature of 100° C. without any detrimental action on the product.

This mixture contains about 28% of metallic copper which may be reduced to 25% by incorporating to the mixture 14 kgs. of talc. It is also possible to incorporate 12 kgs. of talc and 32 kgs. of sublimated or finely ground sulphur, which provides a mixture containing together 20% of metallic copper and 20% of sulphur and is adapted to contend both with mildew and oidium.

*Example II*

A mixture is made of:
60 kgs. of a cupric hydrate—calcium chloride compound containing 42% of metallic copper;
20 kgs. of commercial sulphate of alumina containing 17% of Al₂O₃.
28 kgs. of crystallized barium chloride.

The whole is crushed and treated as above so as to yield a mixture containing in combination about 25% of metallic copper.

*Example III*

There is introduced into a mixer 750 kgs. of a pulverized cupric hydrate-calcium chloride compound containing about 40% of metallic copper, the formula of which is 4Cu(OH)₂BaCl₂mH₂O. Into this compound there is then poured gradually:

220 kgs. of commercial hydrochloric acid at 21° Baumé. After a few minutes of stirring, the reaction is at an end and the product appears as a plastic mass containing about 31% of metallic copper and providing a stable emulsion through mere dilution by water.

The product obtained may be sold as an aqueous paste; but it may also be dried at a temperature of 100° C., without losing any of its properties.

The copper contents of the product thus obtained may be reduced to a lower value by adding a soluble or non-soluble filling as described above.

A rough mixture is made of:
550 kgs. of a cupric hydrate-barium chloride compound.
250 kgs. of crystallized copper sulphate and 60 kgs. of barium chloride.

The mixture obtained is crushed in a mill or a centrifugal crusher. The product is abandoned to itself during 4 to 5 days after which the reaction due to the presence of the crystallization water of the copper sulphate is at an end.

The product obtained may be sold as it is or else as above, after reduction to predetermined copper contents by means of a filling.

To 550 kgs. of a cupric hydrate-calcium chloride compound, diluted in a certain amount of water, either pure or loaded with CaCl₂, for instance the mixture obtained directly from the decantation of attacking liquors in the preparation of the oxychloride, there is added an amount of hydrochloric acid or of copper chloride slightly above that required for displacing the whole of the calcium chloride, i. e. about 160 kgs. of hydrochloric acid at 21° Baumé or 150 kgs. of CuCl$_2$.

There is also added 1 kg. of sulfate of lime. The whole is then stirred and the ingredients are left in contact during a few hours.

The product formed is copper oxychloride in conformity with above formula. However the small amount of soluble sulphate of lime which has been added prevents the emulsion from forming and allows the filtration of the precipitate. The latter is collected and dried by the usual means. It is then admixed in the dry state with 50 kgs. of barium chloride and crushed therewith. The barium chloride eliminates the soluble sulphates and allows the product to form a suspension.

The calcium chloride, originally retained by the oxychloride, is regenerated in the mother liquor and may be used again.

*Example IV*

A mixture is made of cement copper containing 320 kgs. of pure copper, for instance 355 kgs. of industrial cement copper at a purity grade of 90% with 620 kgs. of copper sulphate and 100 kgs. of crystallized barium chloride.

The mixture is passed through a crusher and allowed to rest. The reaction (6) takes place under the action of the water brought by the copper sulphate and it is complete after 5 to 6 days.

What I claim is:

1. A cupric anticryptogamic composition adapted to form very fine and stable colloidal suspensions in water, constituted substantially by a cupric oxychloride with a proportion of free soluble barium salt, said composition having a reaction from slightly acid to neutral with reference to litmus.

2. A cupric anticryptogamic composition consisting of a cupric oxychloride having the formula 4Cu(OH)$_2$CuCl$_2$ and a free soluble barium salt, said composition having with reference to litmus, a slightly acid to neutral reaction.

3. A method for preparing a cupric anticryptogamic mixture consisting in precipitating in the presence of an excess of a soluble barium salt cupric oxychloride from a compound cupric hydrate containing a chloride corresponding to the formula 4Cu(OH)$_2$RCl$_2$ wherein R designates a metal chosen from the alkaline earth and magnesium group, so as to have in the product a proportion of free soluble barium salt.

PIERRE FRANCOIS JOSEPH SOUVIRON.